UNITED STATES PATENT OFFICE.

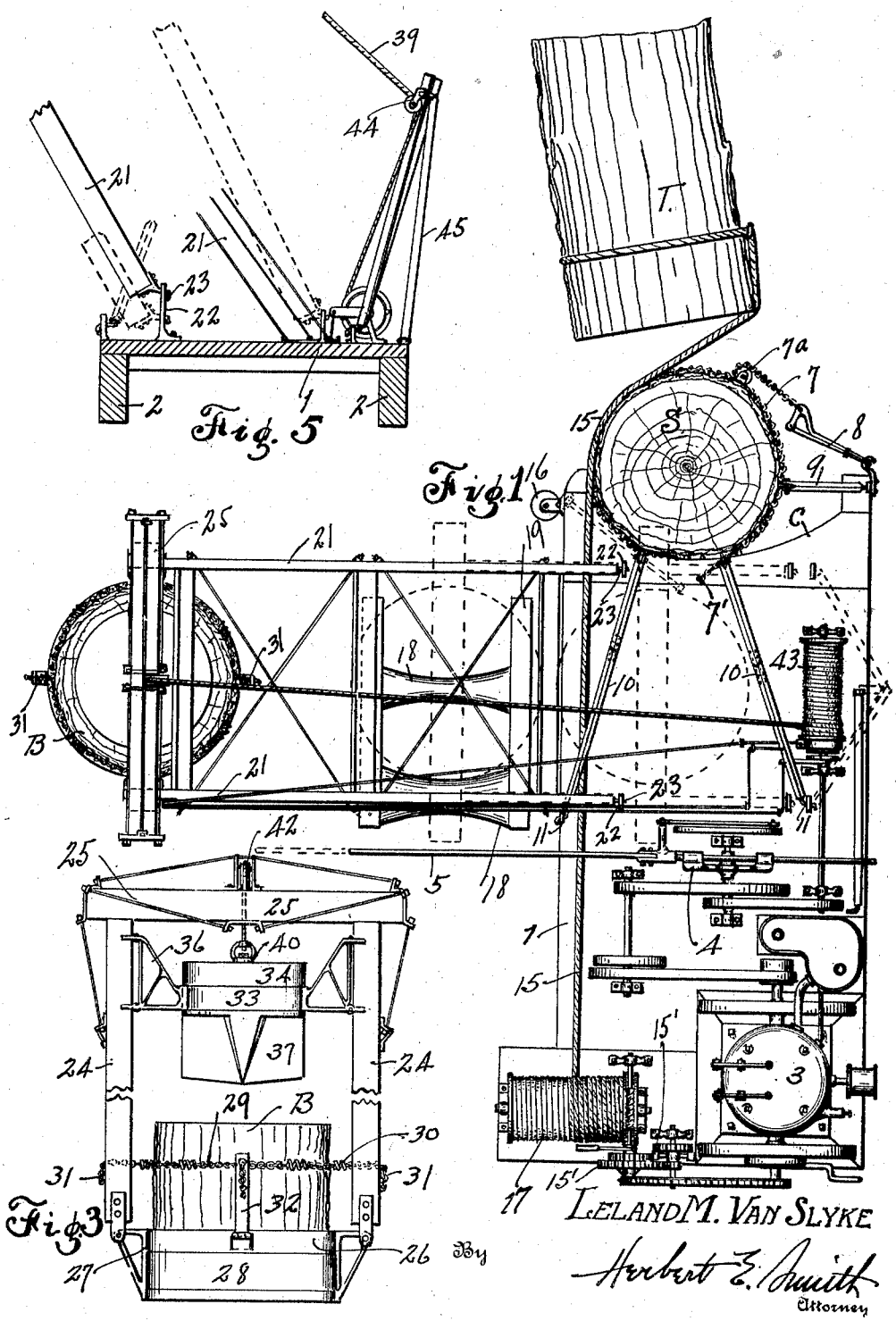

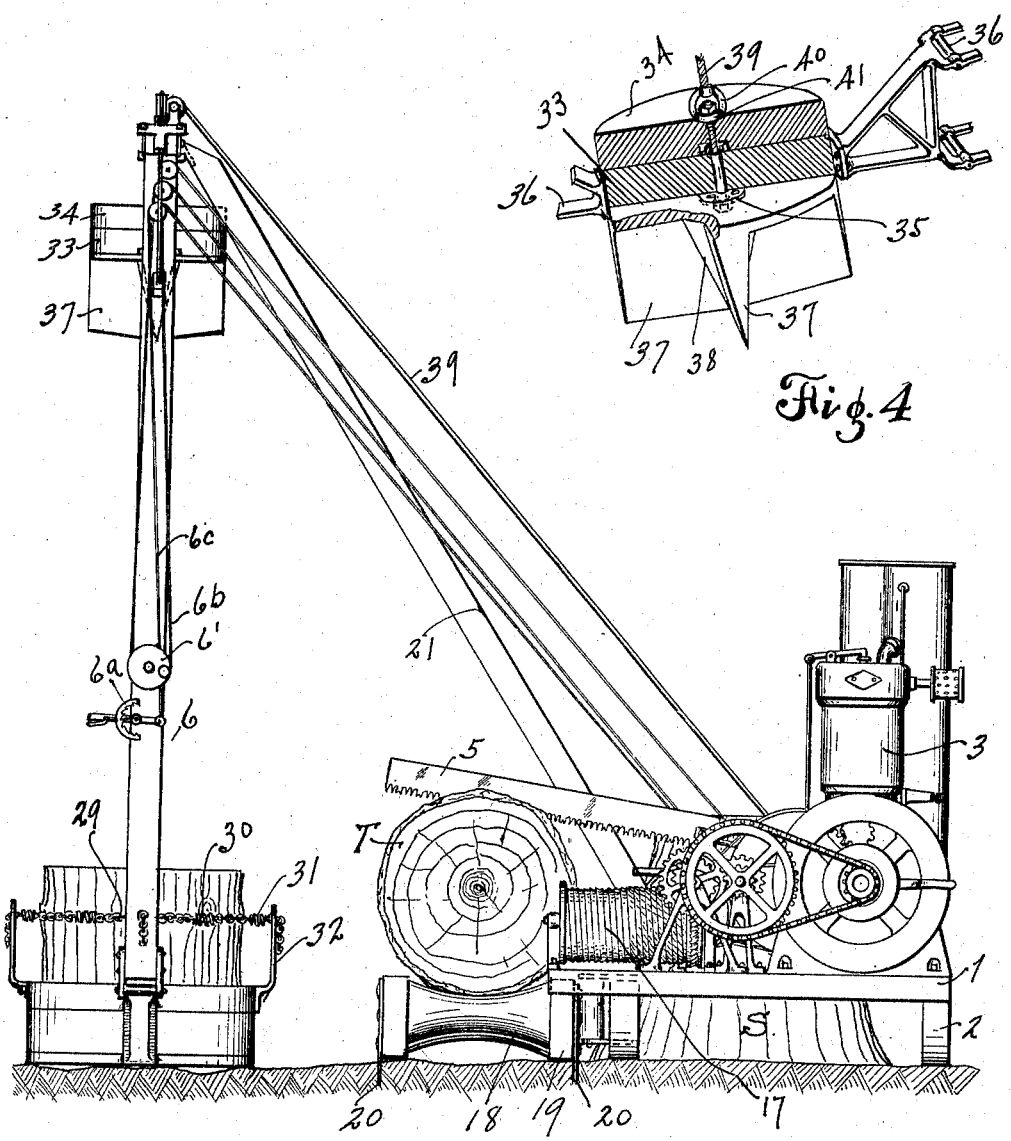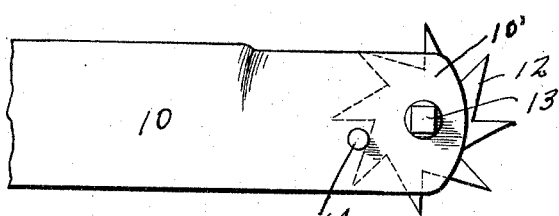

LELAND M. VAN SLYKE, OF CHEWELAH, WASHINGTON.

WOOD SAWING AND SPLITTING MACHINE.

1,307,714.     Specification of Letters Patent.     Patented June 24, 1919.

Application filed July 11, 1918. Serial No. 244,383.

*To all whom it may concern:*

Be it known that I, LELAND M. VAN SLYKE, a citizen of the United States, residing at Chewelah, in the county of Stevens and State of Washington, have invented certain new and useful Improvements in Wood Sawing and Splitting Machines, of which the following is a specification.

The present invention relates to improvements in wood sawing and splitting machines, and is designed particularly for use as a portable apparatus, adapted to be transported over the ground and used in the woodland for sawing and splitting the entire fallen tree into stove lengths for firewood.

The primary object of the invention is the provision of an apparatus of this character that is compact and simple both in construction and operation, may be manipulated with facility to save the expense of labor, and which, withal is well adapted for performing the functions of an implement or apparatus of this type.

By the utilization of the implement a fallen tree, after having been stripped of its branches and foliage, is, with facility and despatch, drawn or hauled by devices forming part of the implement, toward the implement, and successive lengths sawed therefrom, and while the succeeding saw cuts are being made, the blocks of sawed wood may be split into proper size by another part of the mechanism of the implement, and the invention consists in certain novel combinations and arrangements of parts of the implement or apparatus, whereby these functions of the machine are carried out.

In the accompanying drawings one complete example of the physical embodiment of the invention is illustrated, according to the best mode so far devised for the practical application of the principles of the invention.

Figure 1 is a top plan view of the implement embodying the novel features of the invention, showing the implement attached to a tree stump and in position to haul a fallen tree to position for sawing.

Fig. 2 is a side elevation of the machine, showing the sawing operation and also the wood splitting devices.

Fig. 3 is a front view of the wood splitting device, detached, and partly broken away for convenience of illustration.

Fig. 4, is an enlarged, partly sectional, perspective view of the knife or cutter of the splitting device.

Fig. 5 is a sectional view of the platform or skid, showing the manner of adjusting the boom of the derrick of the splitting device.

Fig. 6 is an enlarged detail showing a "star wheel" at one end of one of the brace rods used in connection with the stump of the tree to which the implement is anchored.

As before stated the implement is adapted for use in the woodland and is transported or drawn over the ground, to follow up the felling of trees and to cut and split the timber into fire-wood size.

The preferred embodiment of the invention is illustrated in the drawings, and for convenience of description the fallen tree is designated T, the stump from which the trunk has been sawed is indicated as S and the sawed block of wood, ready to be split into proper size is marked B.

The implement is drawn or transported over the surface of the ground and therefore the platform 1 has a pair of runners or skids 2, 2, beneath it so that when the proper power is applied, as horsepower, the implement may be moved from place to place, and is operated through the instrumentality of the motor or gas engine 3 having the usual operating mechanism 4 to actuate the cross cut saw 5 that is designed to cut the trunk T, in a vertical plane, and the splitting or chopping device indicated as a whole by the numeral 6 is also designed to be actuated in a vertical plane to chop or split into proper sizes the block B.

After the implement has been transported to proper position it is anchored to the tree stump S by means of the chain 7 which is attached to the platform at 7' and wound, once, around the stump and passed over the pulley 7ª that is temporarily supported on the stump, and by means of the "take up" device indicated at 8 the slack in the chain is taken up and the chain drawn taut. The end of the platform is curved, as at C, to accommodate the stump and by means of the brace bar 9 and brace rods 10 the implement is held stable with relation to the stump. These braces are pivoted to the platform 11, and are disposed so that they radiate from the approximate center of the stump, when in position, and incline upwardly from their pivoted ends, so that their free ends, which carry each a "star wheel" 12, will contact with the surface of the stump through the instrumentality of these wheels, and when the braces are forced downwardly the free ends 10' of the braces, which are bifurcated for the star wheels or ratchet wheels, are lowered and cause the teeth of these star wheels or ratchet wheels to engage or bite in to the surface of the stump. The free ends of the braces are forced downwardly by applying a wrench or other tool to the squared end 13 of the wheel axle, and then after the braces have been forced into proper position, the locking pin 14 is passed through openings in the end 10' for the purpose, to lock the ratchet wheel against movement. In this position the implement is anchored to the tree stump with stability sufficient to support and allow movement of the working parts of the implement.

By means of the hauling rope 15 on the drum 17 the tree trunk T is now hauled to position for sawing into proper length, and if necessary the idle roller 16 may be utilized either for the rope or to prevent the trunk rubbing against the implement. Through the medium of the drum 17 and the driving gears 15' of the engine the rope is wound upon the drum and the trunk is pulled onto and supported by the rollers 18. These rollers are preferably arranged in pairs, with their axes parallel with the line of movement of the saw, and are curved to conform to the circular lines of the trunk, and they provide a cradle for the trunk while it is being sawed into lengths, stakes 20 being attached to the frame 19 of the rollers for holding the cradle in rigid position, it being understood of course that the stakes are driven into the ground for the purpose.

After a block B has been sawed from the trunk it is split up into proper size through the use of the splitting device 6 which is supported from the platform of the implement by the derrick 21 through brackets 22 on the platform and the bolts 23 at the lower end of the derrick. There are several of these brackets, arranged in pairs, for the derrick, located in various places transversely of the platform, and also of varying height, so that the implement may be adjusted to level position while on uneven or irregular ground, as readily understood.

The derrick is provided with a pair of fixed, vertically positioned guide bars 24, and a cross head 25 at the top thereof, which form the supporting and guiding frame for the splitting or chopping device 6, and at the base of this guide frame is a base block 26, secured to the frame bars by brackets 27 and a ring or band 28 around the block. The block B to be split is placed on the base block, which rests on the ground, and a flexible or resilient binding chain 29 surrounds the wood block to hold the split pieces from falling away from the block as the operation progresses. This flexible resilient chain is provided with springs 30 connecting its sections, and four diametrically arranged supporting chains 31 retain the resilient binding chain in place by their connection, in pairs, to the guide bars 24, and to the fixed brackets 32 projecting upwardly from the base block 26 to which they are attached. Thus, as the circular or cylindrical wood block is split into successive segments, the bunch of segments are held in approximate cylindrical shape by the resilient chain, so that the splitting device 6, which is capable of rotation horizontally, may be made to split the block into comparatively small pieces.

The splitting member 6 comprises a head 33 in the shape of a round flat disk, and the upper weight-disk 34, having the swivel bolt 35, and the splitting member has diametrically arranged guide arms 36 adapted to slide over the two bars 24 of the derrick and guide the splitting member in its vertically reciprocating movements. The cutter of the device has four blades 37, arranged as shown to cut the block into four quarters at each stroke, and these cutters are fashioned with beveled or wedge portions 38, which, as the blades descend into the block, force the quarters outward radially to provide proper clearance for the cutting blades, and the resilient binding chain 29 co-acts with these beveled or wedge shaped cutters to permit this outward spread of the cut segments after which the chain returns the bunch of segments to compact, alined, position ready for the next stroke. The splitting member is operated through the agency of the control disk 6' and 6ª and their respective ropes 6ᵇ and 6ᶜ that are connected properly with the engine mechanism. The hoist rope 39, for the splitting member, has its ring 40 swiveled at 41 to the weight portion of the head, and extends over the guide pulley 42 back to the winding drum 43, which is controlled by the control disk and lever in usual manner.

When the implement is to be transported, the derrick is pulled over to one of the positions indicated in dotted lines Fig. 1, where the base block is represented by circles, and the hoist rope 39 is passed over the pulley 44 supported on the frame 45 at the back of the platform, and thence to the drum 43, it being apparent that the leverage is sufficient to pull the derrick over on its pivot bolts 23.

What I claim is:—

1. In a sawing machine the combination with a platform and sawing mechanism, and a log hauling device therefor, of an anchoring device comprising pivoted braces adapted to co-act with a tree stump and provided at the free ends with toothed wheels to bite into the stump, and means for locking the wheels in position.

2. In an implement as described an anchoring device comprising pivoted braces adapted to co-act with a tree stump and having bifurcated free ends, a toothed wheel journaled in each end and adapted to bite into the stump, and a locking pin for each wheel adapted to be passed through a perforation in the forked end.

3. The combination with a platform, a hauling drum and rope and motor for the drum, and an attaching chain for engagement with a tree stump, of braces pivoted on the platform and arranged radially of the tree stump to act therewith for anchoring the platform, and each said brace located in an inclined position and provided with a toothed wheel at its upper free end adapted to engage the tree stump and means for locking the wheel in position.

In testimony whereof I affix my signature.

LELAND M. VAN SLYKE.